United States Patent [19] [11] 4,413,324
Tatsuwaki et al. [45] Nov. 1, 1983

[54] TEMPERATURE PATTERN MEASURING METHOD AND A DEVICE THEREFOR

[75] Inventors: Masao Tatsuwaki; Shin Nemoto, both of Osaka; Seiichi Okuhara, Tokyo, all of Japan

[73] Assignee: Sumitomo Kinzoku Kogyo Kabushiki Kaisha, Osaka, Japan

[21] Appl. No.: 238,360

[22] Filed: Feb. 25, 1981

[51] Int. Cl.³ ............................................... G01J 5/18
[52] U.S. Cl. .................................. 364/557; 364/525; 356/45; 358/107
[58] Field of Search ....................... 364/557, 525, 526; 358/100, 101, 106, 107, 110, 113; 73/355 R, 356; 356/45, 416, 418; 250/358 P, 342, 338

[56] References Cited
U.S. PATENT DOCUMENTS

| 4,121,459 | 10/1978 | MaCall et al. | 73/355 R X |
| 4,168,430 | 9/1979 | Denis et al. | 358/113 X |
| 4,222,663 | 9/1980 | Gebhart et al. | 356/45 |
| 4,254,338 | 3/1981 | Abel et al. | 364/557 X |
| 4,257,106 | 3/1981 | Auer | 364/525 |
| 4,305,096 | 12/1981 | Tokoshima et al. | 358/106 X |
| 4,326,798 | 4/1982 | Kahn | 73/355 R X |

Primary Examiner—Edward J. Wise
Attorney, Agent, or Firm—Wenderoth, Lind & Ponack

[57] ABSTRACT

A temperature pattern distribution measuring method and apparatus by which portions of light from parts of an area of an object whose temperature distribution pattern is to be measured, and whose parts are in a predetermined pattern, are passed through first and second optical filters which respectively pass different wavelengths of light. The level of engery passed by the respective filters for the respective portions of light are determined by scanning the light from the filters with a pickup device or devices and, by using the determined energy levels, an arithmetic unit carries out a two-color temperature determining operation for the respective parts of the area for determining the temperature on each part of the area of the object. The temperature pattern of the area of the object can thereby be determined from the temperatures of the parts of the area.

13 Claims, 11 Drawing Figures

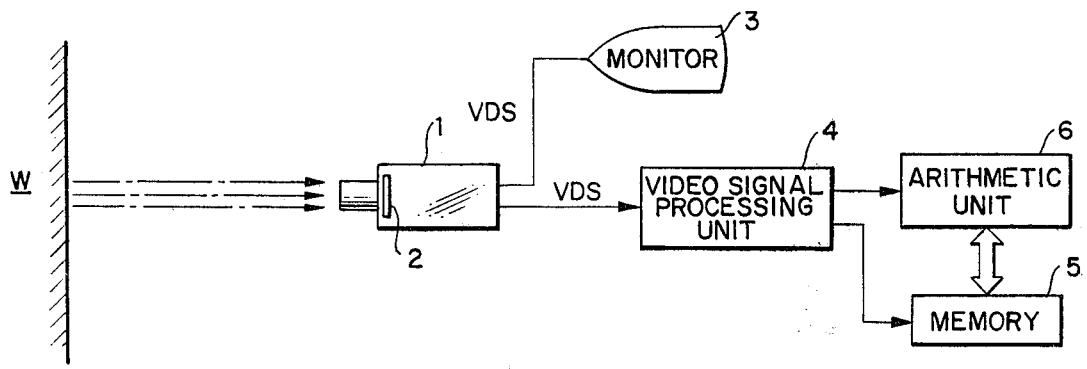
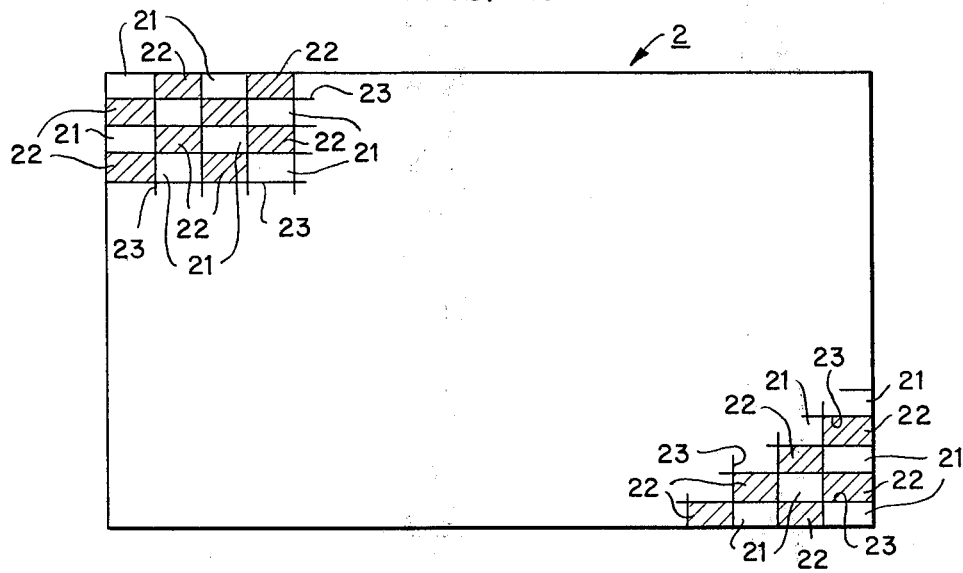
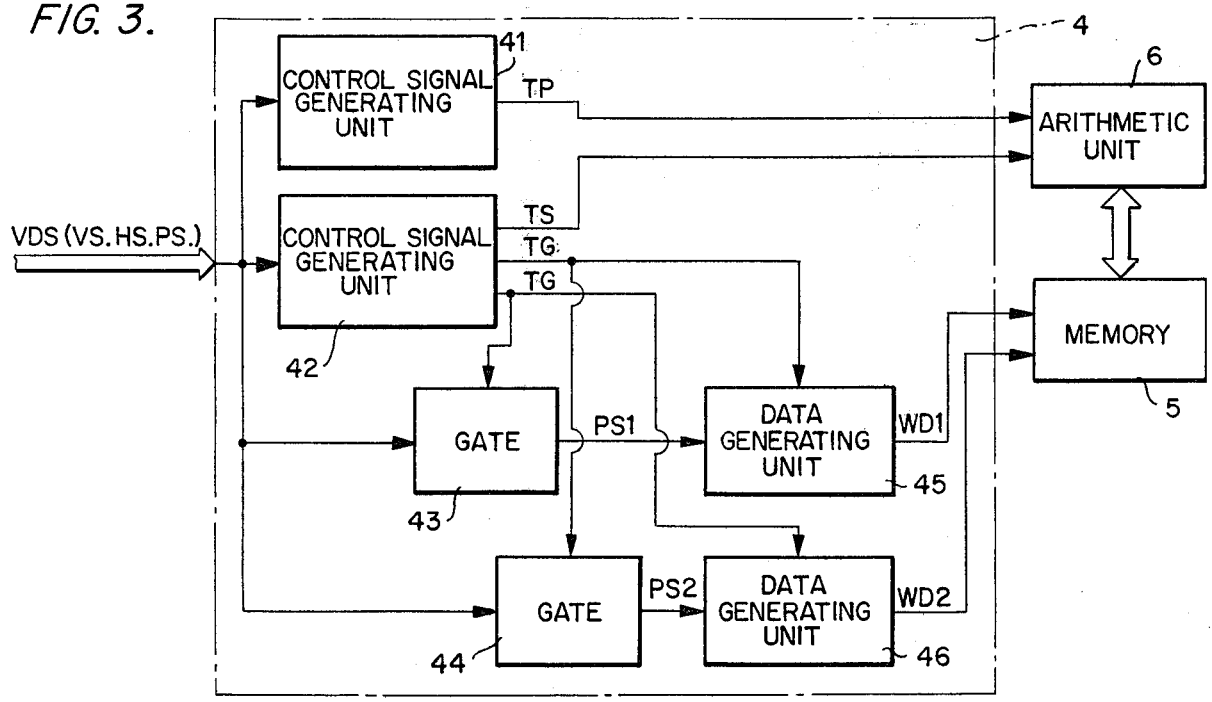

TEMPERATURE PATTERN MEASURING METHOD AND A DEVICE THEREFOR

BACKGROUND OF THE INVENTION

1. Field of the Invention

This invention relates to a temperature pattern measuring method for obtaining the distribution of surface temperatures over the surface of an object, and to a device for carrying out the method.

2. Description of the Prior Art

Generally, temperature pattern measuring methods have widely employed an infrared ray system which picks up by an infrared ray detection element in a two-dimensional pattern the optical energy of infrared rays emitted from an object the surface temperature distribution of which is to be measured, and scans the two-dimensional pattern and produces and displays a temperature pattern of the surface area of the object, for example, graphically on a cathode-ray tube (CRT). A measuring method using an infrared ray system, however, is inadequate for an object which changes temperature rapidly because two or more seconds are required for scanning to produce one picture. Moreover, the infrared rays picked up as representing temperature information are apt to be affected by the atmosphere surrounding the light propagation path due to the existence of vapor or dust, thereby lowering the sensitivity and accuracy. It is impossible in practice to avoid the influence of the surrounding atmosphere by the use of an image guide, because the attenuation of the quantity of light within the image guide is large in the infrared ray wavelength range. Furthermore, the minimum visual field within which measurement can be carried out is a 10 to 20 centimeter-angle, so that a temperature pattern in a smaller area cannot be measured. Hence, the infrared ray system cannot be used for measurement of the temperature pattern of an object, such as a slab in a continuous casting process in a steel mill or an electrically seamed steel pipe which is being welded, which is in a bad atmosphere having a lot of vapour or dust and which is undergoing a large temperature change. Moreover, it is impossible for this system to measure the temperature pattern in a small area, such as a heated portion of the edge of an electrically seamed steel pipe.

On the other hand, a two-color thermometer, which is used to carry out the present invention, picks up two particular wavelength components in visible light emitted from an object, thereby carrying out non-contact measurement of the surface temperature of the object. The two color thermometer can measure a typical temperature within the temperature range in which visible light is emitted, but cannot measure a temperature pattern. Because iron manufacturing and steel manufacturing processes often require the measurement of a temperature pattern, the above described temperature measuring methods cannot easily fulfill such a requirement.

SUMMARY OF THE INVENTION

This invention has been made to solve the above described problems.

An object of the invention is to provide a temperature pattern measuring method which utilizes a two-color thermometer and a video information process so that the measurement is substantially unaffected by the surrounding atmosphere, and which method is capable of making a temperature pattern measurement with high accuracy and high resolving power.

Another object of the invention is to provide a temperature pattern measuring device capable of carrying out the above temperature pattern measuring method.

Still another object of the invention is to provide a temperature pattern measuring device in which an image guide can be used and which is capable of measuring the temperature pattern in a small area or an area which is deep within an object and is invisible from the exterior of the object.

To achieve these objects, this invention provides a temperature pattern measuring method which views an object the temperature pattern of which is to be measured by an image pickup device to obtain the temperature distribution on the portions of the object in the picked-up picture of the objects. The light from the object is passed through first and second optical filters which pass different selected wavelength components of the light emitted from the object, and a two color temperature determining operation is carried out for every area of one or more video picture frames produced by the light passing through the respective first and second optical filters, whereby a temperature is determined for each portion of the object corresponding to the respective areas of the picture frames.

The device used in the above described measuring method in order to pick up the light emitted from the object can utilize: a first system in which the light emitted from each portion of the object within the visual field simultaneously passes first and second filters arranged at slightly different positions in a plane pattern in a single filter for a single pickup device; a second system in which the light from the object passes to a single pickup device through a first optical filter for a certain period of time and then light from the object passes to the pickup device through a second filter for a period of time; or a third system in which the light emitted from the object simultaneously passes through the first and second filters to separate image pickup devices. The picture portions of the video signal from the pickup devices corresponding to an area for which the temperature is to be determined is used as data for a two-color temperature determining operation. In the first system the areas for which data is obtained are in slightly different positions, and the data is obtained at the same time, while in the second system the areas are in the same position but the data is obtained at different times. In the third system the obtaining of data is for the areas in the same position and the data is obtained at the same time.

BRIEF DESCRIPTION OF THE DRAWINGS

Other and further objects and novel features of the invention will be more fully apparent from the following detailed description together with the accompanying drawings, in which:

FIG. 1 is a schematic block diagram of a first embodiment of a device according to the invention for carrying out the method of the invention by using the first system;

FIG. 2 is a schematic representation of the pattern of an optical filter;

FIG. 3 is a block diagram of a video signal processor used in the embodiment of FIG. 1;

DESCRIPTION OF THE PREFERRED EMBODIMENTS

Figure 4:
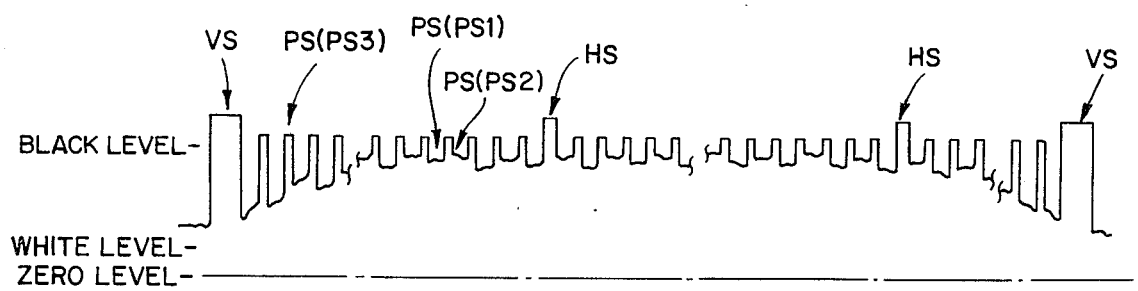
FIG. 4 is a representation of the waveform of a video signal.

A temperature pattern measuring method according to the invention and using the first system will be described in detail. In this method an optical filter is disposed in a light path within or outside an image pickup device, and the filter has first and second filter segments combined in a given pattern, through which segments pass first and second wavelength components which are different form each other. A two-color temperature operation is carried out for every area corresponding to two filter segments in each frame picked up by the image pickup device, using the light passing through the first and second filter segments and the temperature at each portion of the object corresponding to each such area is determined, thereby obtaining a temperature pattern.

An embodiment of a device according to the invention, which carries out the above described method, will be described in connection with FIGS. 1–7.

FIG. 1 is a schematic block diagram of a device according to the invention, in which W designates the object the temperature pattern of which is to be measured, reference numeral 1 designates an image pickup unit facing the object, 2 designates an optical filter disposed in proximity to the image pickup means of the image pickup unit 1, 3 designates a monitoring cathode ray tube (CRT) to display an image of the object picked up by image pickup unit 1, 4 designates a video signal processing unit for data-processing the video signal output from image pickup unit 1, 5 designates a memory for storing data from the video signal processing unit 4, and 6 designates an arithmetic unit which carries out a two-color temperature determining operation based on the contents of memory 5 and the signal output from video signal processing unit 4.

The image pickup unit 1 is a conventional video camera, which should have an image pickup tube with a dynamic range sufficient to receive light of wavelengths $\lambda_1$ and $\lambda_2$ passing the optical filter 2 to be described in detail hereinafter. For example, a tube using siliconvidicon or Chalnicon (Trade name of Toshiba Co.) is suitable for use in the visible wavelength range. Such an image pickup tube as well as a solid image pickup element, such as a charge-coupled device (CCD), if it has a good spectral sensitivity, can be used. The pickup unit should also have an interior control unit similar to a conventional one for outputting a composite video signal including a picture signal, horizontal synchronizing signal, and vertical synchronizing signal.

The optical filter 2, as shown in FIG. 2, has the shape of a rectangle to conform with the visual field of image pickup unit 1, but need not have special dimensions, but can be about 18×24 mm where the effective visual field is 3:4. The optical filter 2 comprises a number of first filter segments (unshaded) and second filter segments (hatched) in the form of small rectangles or squares of equal size, which are disposed alternately in a matrix extending horizontally and vertically corresponding to the means in the pickup device for detecting the pattern of light entering the pickup device. Between the first and the second filter segments are interposed stripe-like shade zones 23 to block passage of light. The first and second filter segments are optical band-pass filters respectively having wavelengths $\lambda_1$ and $\lambda_2$ at the center of the wavelengths passed thereby, and which have a high transmittivity and a narrow bandwidth in order to raise the measurement accuracy. It is preferable to use an interference filter rather than an absorption-type filter. Such an optical filter 2, if it is assumed that $\lambda_1 < \lambda_2$, has, in the areas formed by filter segments 21, low-pass filters allowing passage of light with a wavelength from a wavelength slightly below up to a wavelength slightly larger than $\lambda_1$, and in the areas formed by filter segments 22, high-pass filters allowing passage of light with a wavelength above a wavelength slightly smaller than up to a wavelength slightly larger than $\lambda_2$. The filter 2 is thus constructed of a complex pattern of band-pass filters throughout the area thereof which pass light with wavelengths in a band with wavelength $\lambda_1$ at the center and in a band with wavelength $\lambda_2$ at the center.

The pattern of the arrangement of filter segments 21 and 22 is not limited to that shown but may of course be other forms of longitudinal or transverse arrangements. The size of the respective filter segments 21 and 22 controls the resolving-power, so that is is desirable to reduce the size as much as possible. As a practical matter, the size is limited by the manufacturing techniques for optical filters and also by the memory capacity of memory 5 and the computing speed of arithmetic unit 6. In this embodiment, filter segments 21 and 22 are rectangular, and the number in the matrix is vertical 128×horizontal 128, and the shading zones are about 40 $\mu$m in width. The aforesaid wavelengths $\lambda_1$ and $\lambda_2$ are selected corresponding to the spectral sensitivity of the image pickup unit, a temperature of the object W to be measured, and the atmosphere.

The video signal processing unit 4 discriminates picture signals from among the video signals outputted by the image pickup unit 1, the picture signal portions each corresponding to the light passing the first and second filter segments, and outputs a two-dimensional position signal for correlating each picture signal component of the video signal with a filter segment.

FIG. 3 is a schematic block diagram of an example of the construction of a video signal processing unit 4, and FIG. 4 shows a wave form of a video signal VDS with negative modulation. The video signal VDS includes vertical synchronizing signals VS which appear once (for sequential scanning) or twice (for jumping scanning) per one frame, horizontal synchronizing signals HS appearing once per one scanning line, and picture signals PS changing in level corresponding to the brightness or darkness of the picture. The picture signals PS include signal components PS1 and PS2 which represent the lightness and darkness of the surface portions of the object W at positions corresponding to the positions of the respective filter segments, that is, data corresponding to the radiant energy at the respective portions of the surface of the object, the information being obtained for each scanning period of the scanning of the portions of light from the object passing the respective first and second filter segments. The signal component PS3 between the components PS1 and PS2 is that obtained by the scanning of the portions of the filter corresponding to shade zones 23, and indicates that the shade zones 23 are dark. The filter segments 21 and 22 are disposed alternately horizontally and shade zones 23 are positioned between filter segments 21 and 22, so that the portions of the picture signal appear in the order PS1, PS3, PS2, PS3, PS1 . . . . The signal components between the segments PS3 have smaller and black levels, and even when only a little light passes filter segments 21 and 22, the transmittivity of each shade zone 23 is selected so that signal component PS3 between the segments PS1 and PS2 has level higher than that of signal components PS1 and PS2.

In the video signal processing unit 4, which receives vdeo signal VDS, a control signal generating unit 41 extracts the vertical synchronizing signals VS and outputs a picture change signal TP each time a new frame is to be started, the picture change signal TP being fed into arithmetic unit 6. Video signal VDS is also fed into control signal generating unit 42 which outputs a position signal TS which indicates a position in a two-dimensional system, and the signal TS is fed to arithmetic unit 6. The control signal generating unit 42 also outputs gate control signals TG, which are supplied to respective gates 43 and 44. The gate control signals TG are fed to gates 43 and 44 at a high level to open the respective gates while portions of light from the object which pass through the respective filter segment 21 or 22 are being scanned. Gates 43 and 44, thus allow video signal VDS to pass, so that there is fed into date generating units 45 and 46 connected behind the gates 43 and 44 only respective picture signal portions PS1 and PS2 corresponding to the portions of light passing the respective filter segments 21 and 22. The data generating units 45 and 46 consist of peak-hold units and analog/-digital converters and hold a minimum value (the peak value is the white level) of the respective signal components PS1 and PS2 fed while respective gates 43 and 44 are open, and output components PS1 and PS2 to memory 5 as data to be written through an analog/digital converter each time the gates 43 and 44 close. Hence, the data to be written WD1 and WD2 represent values of radiant energy corresponding to wavelengths $\lambda_1$ and $\lambda_2$ from the surface portions of the object W corresponding to the above picture signal portions from the respective filter segments 21 and 22.

The position signal TS is substantially a pulse signal corresponding to the component PS3 and is fed into arithmetic unit 6 as writing address information. The gate control signals TG is obtained as outputs of flip-flop which composes control signal generating unit 42 and is connected to be triggered by PS3.

When arithmetic unit 6 permits memory 5 to write-in data, the data corresponding to one picture is written in the memory 5, the data-writing being permitted to begin at the moment picture change signal TP is supplied. Memory 5 stores data WD1 an WD2 in predetermined addresses according to the position signals TS. For example, the writing in is carried out in such a manner that when the arrangement of filter segments 21 and 22 in optical filter 2 is as shown in FIG. 2 so as to show the object W as viewed from the image pickup unit 1, and the portion of the light from the object which passes through the filter segment 21 at the upper lefthand corner, i.e. in the first line and first row, is scanned, the data WD1 corresponding to this portion is fed to the memory 5, and being related by position signal TS to the filter segment 21 in such a position, is stored in the address corresponding thereto.

Figure 5:
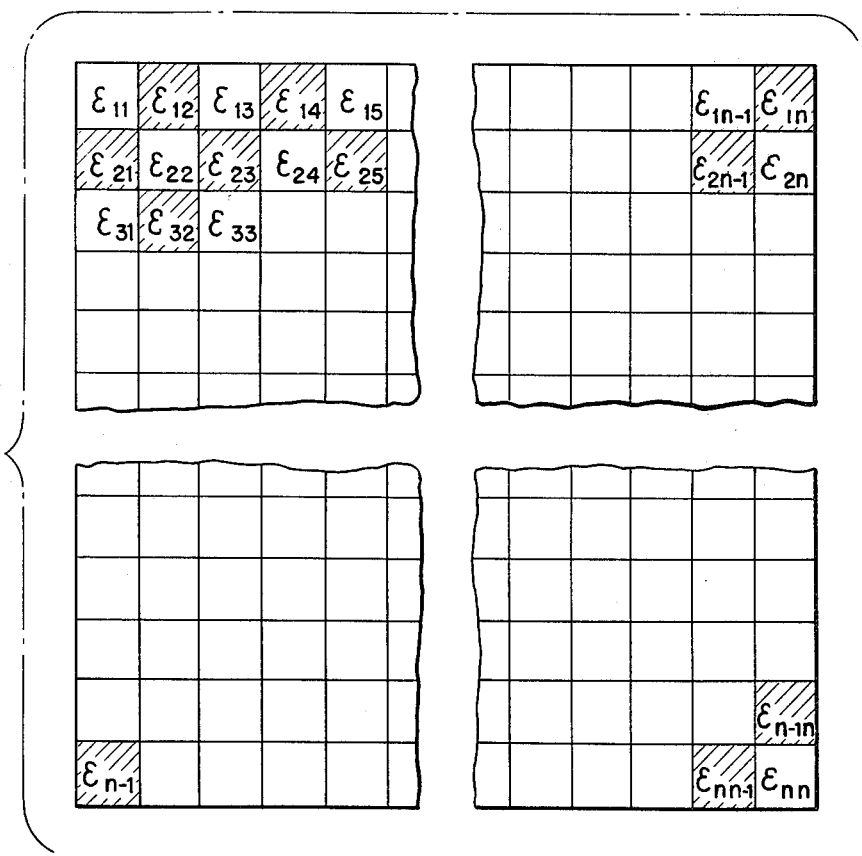
FIG. 5 is a schematic representation of the contents of a memory device.

Next, when the portion of light which passes through the next filter segment 22 to the right, i.e. in the first line, second row, data WD2 corresponding to this portion is fed to the memory 5, and being related by the position signal TS to the filter segment 22 in such a position, is stored in the address corresponding thereto. Thus, upon a finish of writing in data for scanning along one line of the filter, horizontal synchronizing signal HS appears to cause the electron beam of the pickup unit 1 to return to the left end of the filter. The next scan starts with either the filter segment 21 at the left upper corner or the segment 22 directly thereunder in the second line, first row, depending upon the size of the filter segment, the number of scanning lines, and whether sequential scanning or jumping scanning is carried out; however, in this embodiment, scanning density and segment size are chosen so that one line of segments is scanned once a picture. Such steps are repeated to store data for a complete picture in memory 5, so that memory 5 sorts and stores values of radiant energy at the respective wavelengths $\lambda_1$ and $\lambda_2$ from the surface portions of the object W divided according to the arrangement of filter segments 21 and 22. The stored data which corresponds to the maximum brightness on the raster, corresponds to the value of the radiant energy. Thus, the contents of memory 5, in the pattern of filter segments 21 and 22, can be expressed as shown in FIG. 5. In FIG. 5, $\epsilon_{i,j}$ (i,j 1,2 . . . n, where n 128) represents values of radiant energy corresponding to wavelength $\lambda_1$ or $\lambda_2$ passing the filter segment in the line i, row j, in optical filter 2.

Figure 7:
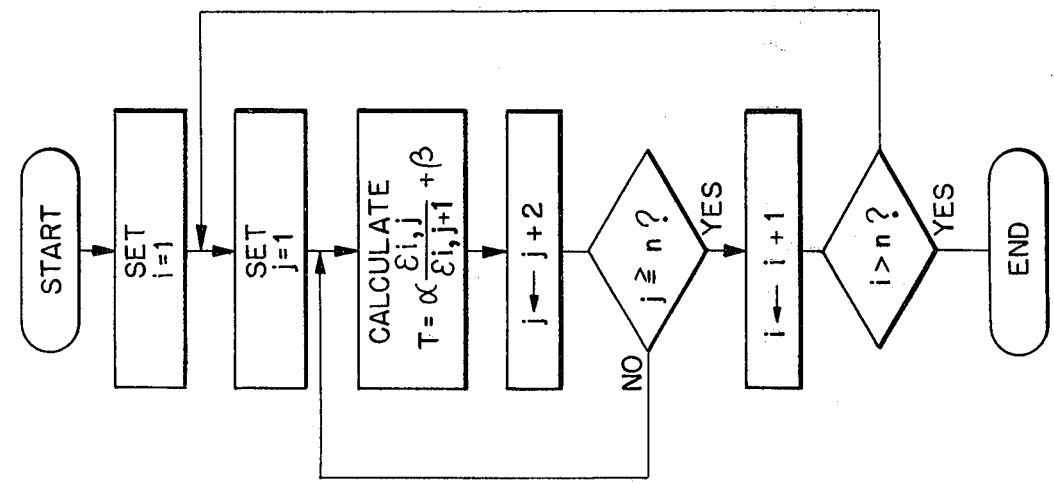
FIG. 6 is a flow chart of an arithmetic unit and FIG. 7 is a detailed flow chart of a part of FIG. 6.
Figure 6:
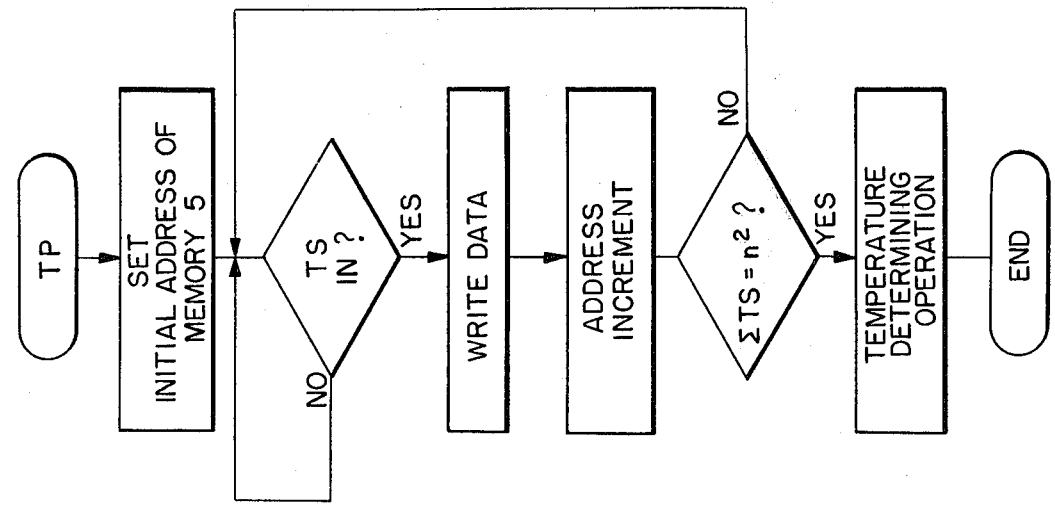

Arithmetic unit 6 reads out the stored contents of the memory and performs a two-color temperature determining operation with the data from each two adjacent filter segments. For example, if $\epsilon_{i,j}$ represents data for wavelength $\lambda_1$ obtained from filter segment 21, then $\epsilon_{i,j+1}$ is data for wavelength $\lambda_2$ obtained from the next adjacent filter element 22. The well-known two-color temperature operation equation (1) gives a temperature T[°K.] for the area of the object from which the portions of light giving the above two data came.

$$T = \alpha \frac{\epsilon_{i,j}}{\epsilon_{i,j+1}} + \beta \tag{1}$$

where $\alpha$ and $\beta$ are constants determined by $\lambda_1$ and $\lambda_2$ respectively. In addition, the equation (1) holds because the relationship between the energy ratio $\epsilon_{i,j}/\epsilon_{i,j+1}$ and the temperature T is appproximately linear in practice. Thus, arithmetic unit 6 sequentially computes the temperature for each area to obtain a temperature pattern for the whole picture or frame, i.e., within the visual field of the pickup device 1, the results of which are displayed by an indicator, such as a CRT display (not shown), or recorded by a plotter or printer as visual information. FIG. 6 shows a flow chart of arithmetic unit 6. When arithmetic unit 6 receives a picture change signal TP, the initial address of memory 5 is set at the address counter in arithmetic unit 6, and each time it receives the position signal TS, the data WD1 or WD2 is written in and the address is changed. When $\Sigma TS$ becomes $n^2$, that is, when all the segments have been scanned, the data writing process is terminated and the temperature determining operation begins. FIG. 7 shows a flow chart of this operation.

Alternatively, the memory 5 can have a memory capacity sufficient to hold data for two frames, and in use can carry out data storage for the next frame while holding data for a prior picture for the arithmetic operation, thereby making it possible to carry out measurement once per 1/30 sec. when using a television system having a capacity of 30 frames per second.

It is also possible to have the plotter or printer print out the average for a plurality of frames. Also, instead of the arithmetic unit carrying out a two-color temperature determining operation using data for each measurement of the energy level for wavelengths $\lambda_1$ and $\lambda_2$, it can carry out two-color temperature determining operation on the basis of the average of a plurality of measurements or the maximum value thereof where it is desired to obtain a typical temperature distribution over a wider area. If the number of filter segments is small, the arithmetic unit can be an analog arithmetic unit.

A temperature pattern measuring method according to the invention and using the second system will be described in detail. In this method, light from the object is caused to pass alternately through first and second optical filters for respectively passing first and second wavelength components which are different from each other, and the two-color temperature determining operation is carried out for each area of the object using the data indicating the levels of energy for each area derived from the light passing through the first optical filters and then the light for the same area passing through the second optical filter, so that the temperature of each area of the object is obtained and together the temperatures give the temperature pattern.

An embodiment of a device for carrying out this above described method will be described with reference to FIGS. 8–10.

Figure 8:
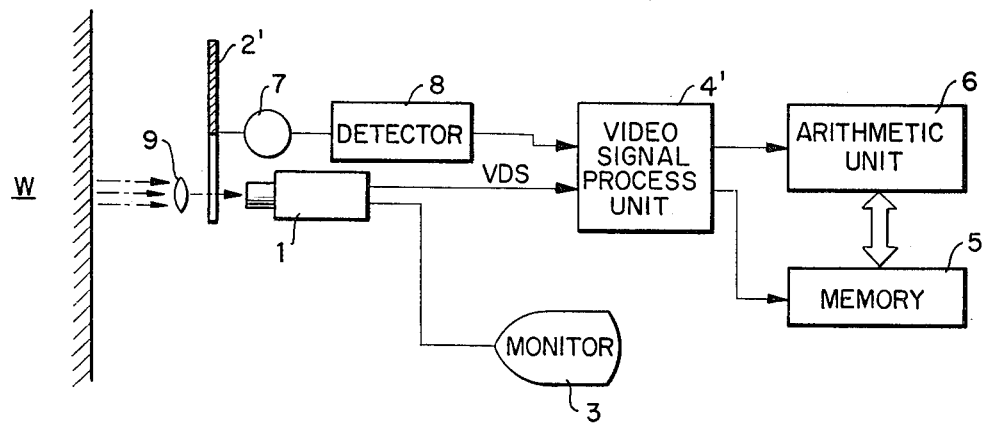
FIG. 8 is a schematic block diagram of a second embodiment of a device according to the invention for carrying out the method of the invention by using the second system.
Figure 9:
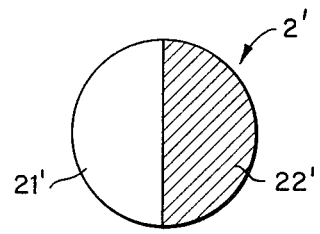
FIG. 9 is a schematic representation of the pattern of a rotary filter.
Figure 10:
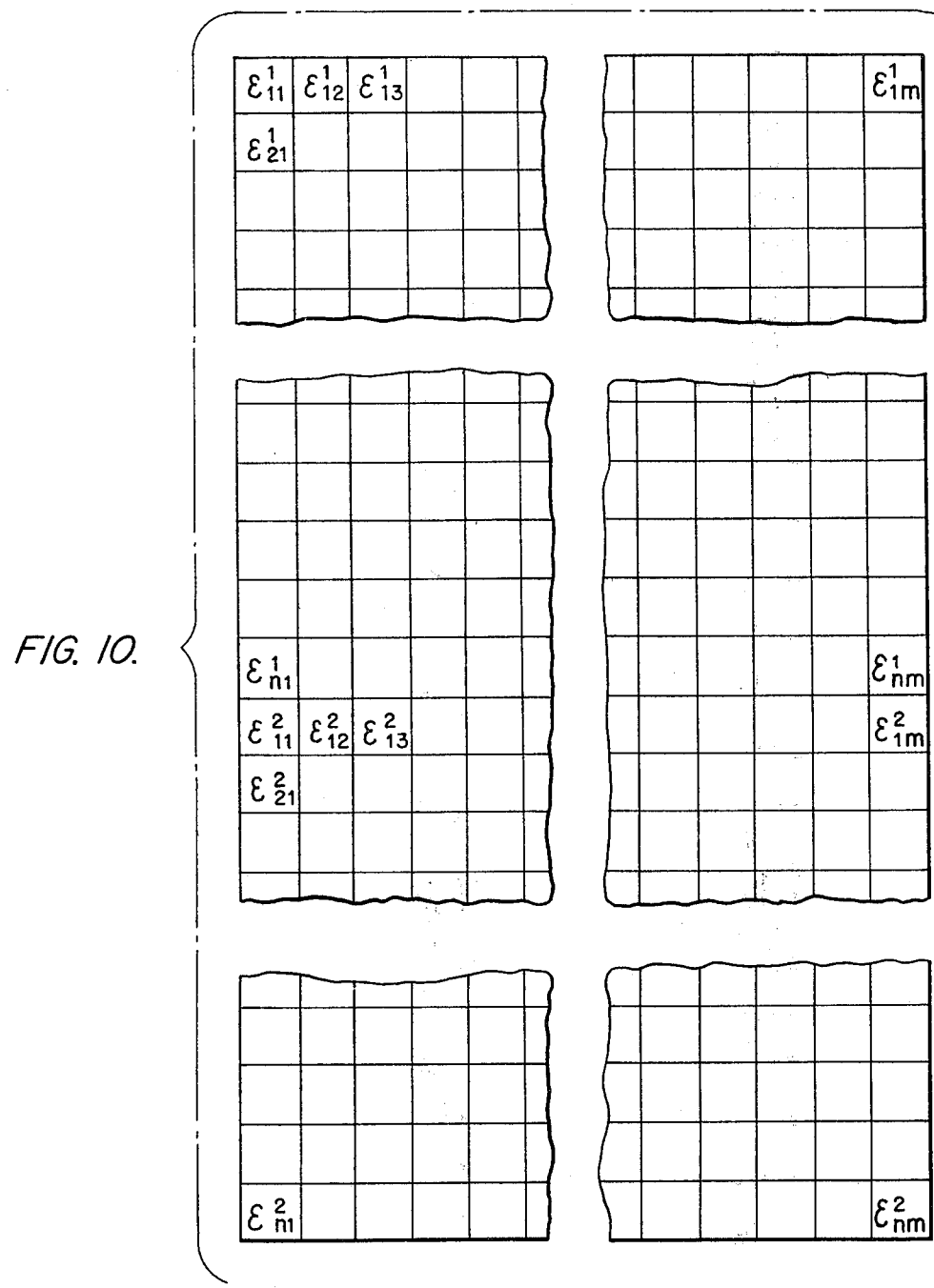
FIG. 10 is a schematic representation of contents of a memory device.

In FIG. 8, reference numeral 1 designates an image pickup unit similar to that in FIG. 2, 4' designates a video signal process unit which functions as hereinafter described, and 3, 5 and 6, designate a monitor, a memory, and an arithmetic unit similar to those in FIG. 2 respectively, and 2' designates a disc-shaped rotary filter as shown in FIG. 9. The filter 2' comprises a semicircular portion constituting a first optical bandpass filter 21' or the like having a wavelength of $\lambda_1$ at the center of the wavelengths passed thereby, and another semicircular portion constituting a second optical bandpass filter 22' having a wavelength of $\lambda_2$ at the center of the wavelengths passed thereby. The filter 2' is disposed in front of the image pickup unit 1 and is parallel to the objective thereof (not shown), so that an intermediate portion approximately midway between the center and the outer periphery of rotary filter 2' is coincident with the optical axis of the objective.

Reference numeral 7 designates a motor connected to the rotary filter 2' to drive it around the center thereof, and 8 designates a rotational position detector comprising a pulse generator, which is connected with the motor and outputs a constant number of pulses per one rotation of rotary filter 2', the detector 8 feeding an output signal to video signal process unit 4'.

The image pickup unit 1, when facing the object W the temperature of which is to be measured, receives light which passes through the rotary filter 2' and reaches image pickup unit 1. The present embodiment further has an auxiliary lens 9 between the object W and the rotary filter 2' for converging the light from the object W to effectively guide it to image pickup unit 1.

In operation, the motor 7 rotates to drive rotary filter 2', for example, at 15 rotations/second, so that the time needed to form one frame, e.g. 1/30 sec., coincides with the frequency of passage of the optical filters 21' and 22' positioned in front of image pickup unit 1, so that the image pickup unit 1 alternately receives light which passes through the optical filter 21' and that which passes through the optical filter 22'. The video signal process unit uses vertical synchronizing signal for each frame in the video signal VDS generated by the image pickup unit 1 as a pause signal for one frame and writes the video signal generated in the time between such pause signals alternately into two areas of memory 5. The data signals from the individual parts of the pickup unit 1 are written into corresponding addresses in one of two groups of addresses in the memory, the addresses being arranged according to the successive scanning lines separated by the horizontal synchronizing signal within the video signal VDS, so that at each address of the one address group is data corresponding to the level of energy received from an area of the object by the respective part of the pickup unit after passing through one of the filters. Video signal process unit 4' produces a timing signal to set the time for sampling the picture signal portions of the video signal on the basis of a horizontal synchronizing signal thereof for sampling the level of picture signal portions, the sampled levels being fed to the respective addresses in the one group of addresses in memory 5 as radiant data energy at a wavelength of $\lambda_1$ or $\lambda_2$ from the object.

The output signal generated by rotary position detector 8 is supplied to arithmetic unit 6 to specify to which group of addresses in memory 5 the video signal is to be directed, i.e. whether to store data as to wavelength $\lambda_1$ or $\lambda_2$. Then, when the data has been written into both groups of addresses in memory 5, the contents of the memory 5 will be as shown in FIG. 10. FIG. 10 shows the viewing area of the pickup device divided into area in two matrixes of n lines, n corresponding to the number of scanning lines in one frame and m rows, m corresponding to the number of areas within one scanning line. The areas of the pickup unit pickup light passing the respective optical filters 21' and 22', so that $\epsilon_{i,j}^1$ and $\epsilon_{i,j}^2$ (i=1,2 ... n, j=1,2 ... m) represent values of radiant energy of wavelengths $\lambda_1$ and $\lambda_2$ received by areas in the i line and the j row of the pickup unit, after passing through optical filters 21' and 22' respectively.

Arithmetic unit 6 reads out the content of memory 5 and using data from the corresponding addresses of the two groups of addresses, carries out a two-color temperature determination operation. For example, for the area at i line, j row, the temperature T [°K.] at the surface portion of object corresponding to the area is given by the following equation:

$$T = \alpha \frac{\epsilon_{i,j}^1}{\epsilon_{i,j}^2} + \beta \qquad (2)$$

In other words, while the first system obtains temperatures from two pieces of data obtained at the same time but at slightly different positions, the second system obtains temperatures from two pieces of data for the same place but taken at slightly different times. It is of course possible to obtain the temperature from pieces of data taken at slightly different times at slightly different places.

After the arithmetic unit 6 sequentially computes the temperature for each area, it supplies the temperature to a means, such as an indicated CRT display or the like (not shown) as in the first embodiment for displaying the desired temperature pattern, and/or recording it. After the finish of the processing of data from the two groups of addresses, writing-in of the data from the next two frames starts.

The above method is advantageous in that it provides a high resolving power while using an optical filter which has a much simpler construction than that used in the first system. In addition, while the apparatus used in this method does not permit connection of an image guide directly to the image pickup unit 1, when the auxiliary lens 9 is used as in the embodiment of FIG. 8, the end of the image guide can be connected optically to the objective face side of lens 9, thereby making possible the use of the image guide. In addition, the rotary filter of course can have a different configuration, for example four portions alternately passing light with wavelengths $\lambda_1$ and $\lambda_2$.

A temperature pattern measuring method according to the invention and using the third system will be described in detail. In this method light from the object is simultaneously picked up by first and second image pickup units after passing through first and second optical filters which respectively pass light of different wavelengths, and the data from the first and second image pickup units is used to carry out a two-color temperature determining operation for each area of the object, the temperature of each portion of the object corresponding to the areas giving the temperature pattern of the object.

An embodiment of a device for carrying out the above described method will be described with reference to FIG. 11.

Figure 11:
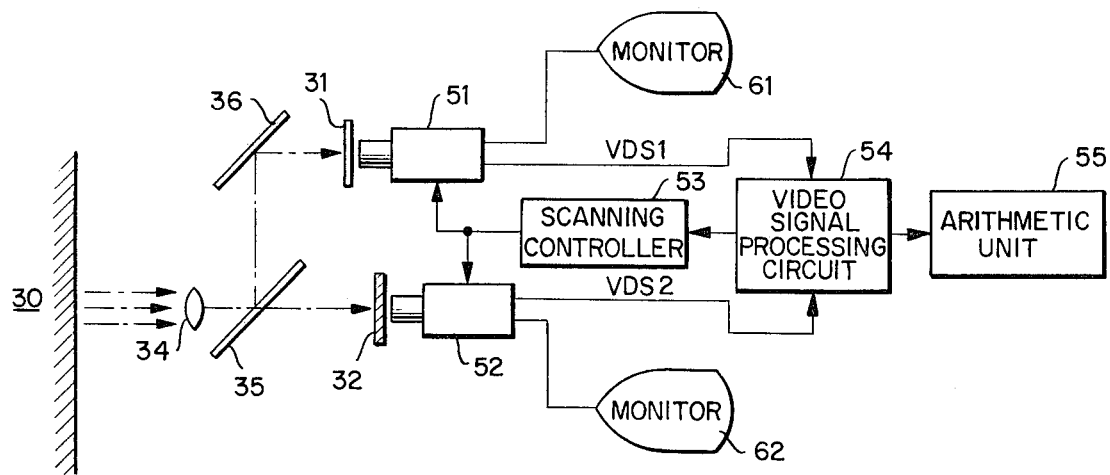
FIG. 11 is a schematic diagram of a third embodiment of a device according to the invention for carrying out the method of the invention by using the third system.

As shown in FIG. 11, the device comprises image pickup devices 51 and 52 the same as the device 1 of FIG. 1, and in front of which are mounted optical filters 31 and 32 respectively, the respective optical filters 31 and 32 passing bands of light with the centers at wavelengths $\lambda_1$ and $\lambda_2$. Between object 30 and image pickup device 52 is a lens 34 for converging light from an object and a neutral density (N.D.) filter 35. N.D. filter 35 is positioned at an angle of 45° with respect to the axis of image pickup lens 34. The light passing N.D. filter 35 falls directly on filter 32 and the passed component enters image pickup unit 52. The light reflected by N.D. filter 35 is further reflected by a mirror 36, which is positioned parallel to N.D. filter 35, and the thus reflected light is directed along an axis parallel to the optical axis of lens 34 and image pickup device 52 and which coincides with the optical axis of image pickup device 51, so as to fall on filter 31, which passes the $\lambda_1$ component to image pickup device 51. Image pickup device 51 and 52 are positioned so as to be equidistant from the lens 34.

Reference numeral 53 designates a scanning controller which is connected both image pickup devices 51 and 52, which cause the outputs of the pickup elements of both devices 51 and 52 to be sequentially taken out synchronously as video signals VDS1 and VDS2. Reference numerals 61 and 62 designate monitors for the respective pickup devices. The vertical and horizontal synchronizing signals in the video signals VDS1 and VDS2 appear simultaneously, as do the picture signal portions of the video signals VDS1 and VDS2 which correspond to a given area of the object 30. The picture signal portions of VDS1 and VDS2 are the data representing radiant energy from the areas of the object and which correspond to wavelengths $\lambda_1$ and $\lambda_2$ respectively. The video signals VDS1 and VDS2 are supplied to a video signal processing circuit 54, and the picture signal portions are sampled at the same times, which are according to the common vertical and horizontal synchronizing signals, in the circuit 54, and the sampled values from video signals VDS1 and VDS2 are supplied to an arithmetic unit 55 one after another. The video signal processing circuit 54 also supplies vertical and horizontal synchronizing signals, and timing signals used for sampling to the arithmetic unit 55. These signals enable the arithmetic unit 55 to correlate the sampled values with the positions of the areas of the object 30.

In this third method, two radiant energy values, which are for light at wavelengths $\lambda_1$ and $\lambda_2$ from same area of the object 30 are supplied to the arithmetic unit 55 simultaneously. In other words, $\epsilon_{i,j}^1$, $\epsilon_{i,j}^2$ in FIG. 10 (in this method, $\epsilon_{i,j}^1$ and $\epsilon_{i,j}^2$ are values sampled simultaneously) are supplied to the arithmetic unit 55 one after another during scanning. The arithmetic unit 55 calculates from said equation (2), and in real time the temperature at each position and obtains the temperature pattern from the results of the calculation, and displays or records it on a display or recording means (not shown).

This third method has the advantage that memory means is not required as part of the device for carrying it out, and real time processing is possible. However, the sampled data can be stored in a memory means and the temperature calculation carried out later.

As can be seen from the foregoing description, the method and device of this invention obtain the temperature pattern of an object by using a two color temperature determining operation using energy emitted from the object in respective bands with center wavelengths of $\lambda_1$ and $\lambda_2$, which energy is not easily affected by the atmosphere, as compared with a thermometer using infrared rays. The present invention makes possible the use of an image guide which cannot be used with infrared rays due to transmission loss. Furthermore, this invention can measure the temperature pattern of a minute area or that at a deep bottom of a structure when the bottom is not visible directly from the exterior. Also, the resolving power can be increased to the limit of the light sensing part of the image pickup device. Moreover, the method and device of this invention have extremely high reliability in comparison with a conventional device of the non-contact type, and can accurately detect the temperature pattern of an object undergoing a great temperature change, e.g., electrically seamed pipes being welded on a production line. Hence, the present invention has great advantages and contributes greatly to advances in this kind of temperature measurement technique.

What is claimed is:

1. A temperature pattern measuring method comprising: passing portions of light from parts of an area of an object whose temperature distribution pattern is to be measured, which parts are in a predetermined pattern, through first and second optical filters which respectively pass different first and second wavelengths of light, determining the level of energy for the respective portions of light passed by the respective filters; and, using the thus determined energy levels, carrying out a two-color temperature determining operation for the respective parts of the area for determining the temperature on each part of the area of said object by solving the equation $T=\alpha(E_1/E_2)+\beta$, wherein T is the temperature to be determined and $E_1$ and $E_2$ are respectively determined energy levels for the first and second wavelengths and $\alpha$ and $\beta$ are constants, whereby the temperature pattern of the area of the object can be determined from the temperatures of the parts of the area.

2. A temperature pattern measuring method as claimed in claim 1, in which the step of passing the portions of light through said filters comprises simultaneously passing one portion of light from one part of the area through one filter and the portion of light from the next adjacent part of the area through the other filter, and the step of determining the level of energy comprises scanning the portions of light which have successively passed the filters, and repeating the steps of the measuring method for adjacent parts over the whole area of the object.

3. A temperature pattern measuring method as claimed in claim 1, in which the step of passing the portions of light through said filters comprises first passing the portions of light from a plurality of parts of the area through only one of the first and second filters, and then passing the portions of light from the same parts of the area through only the other of the first and second filters, and in which the step of determining the level of energy includes scanning the portions of light which have passed through one of the first and second filters and then scanning the portions of light which have passed through the other of the first and second filters, and the step of carrying out a two-color temperature determining operation includes selecting the portions of light from the respective portions of light which have passed through one of the first and second filters and selecting the portions light from the respective portions of light which have passed through the other of the first and second filters and making the determination for the respective parts of the area of the object.

4. A temperature pattern measuring method as claimed in claim 1, in which the step of passing the portions of light through said filters comprises simultaneously passing the portions of light from a plurality of parts of the area of the object through only one of the first and second filters and passing the portions of light from the plurality of parts of the area through only the other of the first and second filters, and in which the step of determining the level of energy includes scanning the portions of light which have passed through one of the first and second filters, and simultaneously scanning the portions of light which have passed through the other of the first and second filters, and the step of carrying out a two-color temperature determining operation includes selecting respective portions of light which have passed through one of the first and second filters, and selecting respective portions of light which have passed through the other of the first and second filters, and then making the two-color temperature determination for the respective parts of the area of the object.

5. A method of measuring the temperature distribution pattern of an object comprising: directing light from the area of the object whose temperature pattern is to be determined along a light path; inserting into said light path a optical filter having a plurality of areas in a predetermined pattern with adjacent areas bering of optical filter material which pass different first and second wavelengths of light; scanning the light coming through the adjacent areas of the filter by a pickup device having a means for determining the level of energy of the respective portions of light passed by the adjacent areas of the filter, and using the output of the pickup device, carrying out a two-color temperature determining operation for respective pairs of adjacent areas by solving the equation $T=\alpha(E_1/E_2)+\beta$, wherein T is the temperature to be determined and $E_1$ and $E_2$ are respectively determined energy levels for the first and second wavelengths and $\alpha$ and $\beta$ are constants.

6. A method of measuring the temperature distribution pattern of an object comprising: directing light from the area of the object whose temperature is to be determined along a light path; passing through said light path a first optical filter which passes a first wavelength of light and then passing through said light path a second optical filter which passes a second wavelength of light which is different from the wavelength passed by the first filter; scanning the light coming through the first filter and then the light coming through the second filter by a pickup device having a means for determining the levels of energy of the light passed by the respective filters and corresponding to parts of the area of the object, and, using the output of the pickup device, carrying out a two-color temperature determining operation for the respective parts of the area of the object by using the output of the pickup device from the scanning of the light from one of the first and second filters for each part of the area of the object and the output of the pickup device from the scanning of the light from the other of the first and second filters for the same part of the area of the object and by then solving the equation $T=\alpha(E_1/E_2)+\beta$, wherein T is the temperature to be determined and $E_1$ and $E_2$ are respectively determined energy levels for the first and second wavelengths and $\alpha$ and $\beta$ are constants.

7. A method of measuring the temperature distribution pattern of an object comprising: directing light from the area of the object whose temperature is to be determined along two separate light paths; placing a first optical filter which passed a first wavelength of light in one light path and a second optical filter which passes a second wavelength of light which is different from the first wavelength passed by the first filter in the second light path; simultaneously scanning the light coming through the filters by separate pickup devices having means for determining the levels of energy of the light passed by the respective filters and corresponding to parts of the areas of the object, and, using the outputs of the pickup devices, carrying out a two-color temperature determining operation for the respective parts of the area of the object by using the output of one pickup device from the scanning of the light from one filter for each part of the area of the object and the output of the other pickup device from the scanning of the other filter for the same parts of the other area of the object and by then solving the equation $T=\alpha(E_1/E_2)+\beta$, wherein T is the temperature to be determined and $E_1$ and $E_2$ are respectively determined energy levels for the first and second wavelengths and $\alpha$ and $\beta$ are constants.

8. An apparatus for measuring the temperature distribution pattern of an object, comprising: a means for directing light from the area of the object whose temperature pattern is to be determined along a light path; an optical filter means which is positioned in said light path, said optical filter means having a plurality of areas in a predetermined pattern with adjacent areas being of optical filter materials which pass different wavelengths of light; an image pickup device which is positioned for picking up the light passed through said filter means and for scanning said filter means and for producing a video signal corresponding to the levels of energy of the light passed by the areas of said filter and for producing a video signal having picture signal portions corresponding to said levels of energy; a video signal processing unit connected to said image pickup device for extracting the picture signal portions of said video signal; a memory means connected to said video signal processing unit for storing the picture signal portions of said video signal in locations corresponding to the positions of the areas of the filter; and an arithmetic unit connected to said memory means for carrying out a two-color temperature determining operation for each pair of adjacent filter areas from the stored picture signal portions corresponding to the energy levels in said areas, said unit solving the equation $T = \alpha(E_1/E_2) + \beta$, wherein T is the temperature to be determined and $E_1$ and $E_2$ are respectively determined energy levels for the first and second wavelengths and $\alpha$ and $\beta$ are constants.

9. An apparatus as claimed in claim 8, in which the areas in said filter means are disposed in a matrix with horizontal and vertical rows of areas, wherein adjacent areas in horizontal rows being of different optical filter materials, and adjacent areas in vertical rows being of different optical filter materials.

10. An apparatus as claimed in claim 9, wherein said filter means further comprises dark zones which are placed between areas of said filter means and which are substantially opaque, whereby the picture signal portions of the video signal are separated by signal portions which are representative of a low energy level.

11. An apparatus as claimed in claim 8, in which said memory means has a capacity for storing picture signal portions from at least two sets of areas of said filter means.

12. An apparatus for measuring the temperature distribution pattern of an object, comprising: a means for directing light from the area of the object whose temperature pattern is to be determined along a light path; an optical filter means having at least two parts each with an area as large as the area of the cross-section of light along said light path, said parts being of optical filter material which pass different wavelengths of light and said filter means being mounted for alternately positioning different parts of said filter means in said light path; an image pickup device positioned for picking up the light passed through said parts of said filter means and for scanning the light passed by said parts of the filter means and for producing a video signal corresponding to the levels of energy of the light passed by areas of said parts of said filter means and for producing a video signal having picture signal portions corresponding to said levels of energy; a video signal processing unit connected to said image pickup device for extracting the picture signal portions of said video signal; a memory means connected to said video signal processing unit for storing the picture signal portions of said video signal for each of the portions of the filter in locations corresponding to the positions of the areas of the filter; and an arithmetic unit connected to said memory means for carrying out a two-color temperature determining operation for each area of the filters from the stored picture signal portions corresponding to the energy levels passed by the corresponding areas in the respective parts of said filter means by solving the equation $T = \alpha(E_1/E_2) + \beta$, wherein T is the temperature to be determined and $E_1$ and $E_2$ are respectively determined energy levels for the first and second wavelengths and $\alpha$ and $\beta$ are constants.

13. An apparatus for measuring the temperature distribution pattern of an object, comprising: a means for directing light from the area of the object whose temperature pattern is to be determined along two separate light paths; an optical filter means in each light path having a sufficiently large size for filtering all of the light in the cross-section of the path, the respective filters being of optical filter materials which pass different wavelengths of light; two image pickup devices, one for each light path, which are positioned for picking up the light passed through the filter means of the corresponding light path and for scanning the light passed by the filter means and for producing a video signal corresponding to the levels of energy of the light passed by areas of the corresponding filter means; a video signal processing unit connected to said image pickup devices for extracting the picture signal portions of the respective video signals; and an arithmetic unit connected to said processing unit for carrying out a two-color temperature determining operation for each area of the filters from the picture signal portions corresponding to the energy levels passed by the corresponding areas in the respective filter means by solving the $T = \alpha(E_1/E_2) + \beta$, wherein T is the temperature to be determined and $E_1$ and $E_2$ are respectively determined energy levels for the first and second wavelengths and $\alpha$ and $\beta$ are constants.

* * * * *